US011361333B2

(12) United States Patent
Holmes

(10) Patent No.: US 11,361,333 B2
(45) Date of Patent: *Jun. 14, 2022

(54) SYSTEM AND METHOD FOR CONTENT RECOGNITION AND DATA CATEGORIZATION

(71) Applicant: Content Aware, LLC, Mineral, VA (US)

(72) Inventor: Cameron A. Holmes, Moseley, VA (US)

(73) Assignee: CONTENT AWARE, LLC, Mineral, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,491

(22) Filed: Aug. 30, 2021

(65) Prior Publication Data

US 2021/0390567 A1 Dec. 16, 2021

Related U.S. Application Data

(63) Continuation of application No. 16/838,021, filed on Apr. 1, 2020, now Pat. No. 11,107,098.

(60) Provisional application No. 62/852,010, filed on May 23, 2019.

(51) Int. Cl.
| | | |
|---|---|---|
| *G06Q 30/00* | (2012.01) | |
| *G06Q 30/02* | (2012.01) | |
| *G06K 9/62* | (2022.01) | |
| *H04L 67/53* | (2022.01) | |

(52) U.S. Cl.
CPC ....... *G06Q 30/0204* (2013.01); *G06K 9/6267* (2013.01); *G06Q 30/0276* (2013.01); *H04L 67/20* (2013.01); *G06V 2201/09* (2022.01)

(58) Field of Classification Search
CPC .......... G06Q 30/0204; G06Q 30/0276; G06K 9/6267; G06K 2209/25; H04L 67/20
See application file for complete search history.

(56) References Cited

U.S. PATENT DOCUMENTS

| | | |
|---|---|---|
| 9,600,499 B2 | 3/2017 | Kutaragi et al. |
| 10,019,730 B2 | 7/2018 | Roundtree |
| 10,191,976 B2 | 1/2019 | Raichelgauz et al. |

(Continued)

OTHER PUBLICATIONS

"Comparative values of variables related to brand logos", by Giorgio p. De Marchis, José M. Reales-Avilés and María del Prado Rivero, in DOI 10.1108/MBE-12-2016-0062 vol. 22 No. 1 2018, pp. 75-87, © Emerald Publishing Limited, ISSN 1368-3047 j Measuring Business Excellence j , Dec. 24, 2016 (Year: 2016).*

(Continued)

*Primary Examiner* — Sun M Li
(74) *Attorney, Agent, or Firm* — Christopher Mayle; Bold IP, PLLC

(57) ABSTRACT

A system and method for decentralizing data and determining performance of different entities in multiple geographical and categorial markets whereby the system may determine complimentary entities to a user's entities or other existing entities for presentation to the user of overlapping procurements and demographics to gather a deeper understanding into the same results yielded by their competition whereby users will be able to provide more personal experiences for each consumer, as well as achieve pricing discovery, greater brand awareness, and marketing strategy.

19 Claims, 5 Drawing Sheets

(56) References Cited

U.S. PATENT DOCUMENTS

| | | | |
|---|---|---|---|
| 2008/0077569 A1* | 3/2008 | Lee | G06F 16/358 |
| 2008/0147730 A1* | 6/2008 | Lee | G06Q 30/0212 |
| 2010/0329549 A1* | 12/2010 | Steinberg | G06T 7/11 |
| | | | 382/164 |
| 2011/0022529 A1 | 1/2011 | Barsoba et al. | |
| 2014/0171039 A1* | 6/2014 | Bjontegard | H04L 67/38 |
| | | | 455/414.1 |
| 2014/0279068 A1* | 9/2014 | Systrom | G06Q 30/0269 |
| | | | 705/14.73 |
| 2015/0186532 A1* | 7/2015 | Agarwal | G06F 16/951 |
| | | | 707/722 |
| 2018/0350144 A1* | 12/2018 | Rathod | A63F 13/216 |

OTHER PUBLICATIONS

Journal of Microscopy, vol. 265, Issue 2 2017, pp. 185-195 doi: 10.1111/jmi.12474 Received Feb. 29, 2016; accepted Aug. 25, 2016 Automatic thresholding from the gradients of region boundaries G. Landini *, D. A. Randell *, S. Fouad* & A. Galton (Year: 2016).*
Talkwalker, Inc., "Talkwalker" [accessed Mar. 1, 2019].

* cited by examiner

SYSTEM AND METHOD FOR CONTENT RECOGNITION AND DATA CATEGORIZATION

CROSS REFERENCE TO APPLICATIONS

This application is a continuation of non-provisional application Ser. No. 16/838,021 filed on Apr. 1, 2020 which claims priority to U.S. Provisional Application No. 62/852,010 filed on May 23, 2019, which is incorporated by reference in its entirety.

FIELD OF THE DISCLOSURE

The overall field of this invention relates generally to the field of content recognition and data categorization. In particular, the disclosed embodiments relate to a system and method for enabling the use of captured media to identify various objects for utility purposes.

BACKGROUND

Customarily, commercial entities and consumers use various applications and services to share content with friends and family, or business purposes. Content may include multimedia such as photographs, text, links, and locations. Content may be geared to capture and share memories of (or live) events, activities, and purchases. In relation to photo-sharing, most commercial and consumer users who capture and share content leverage their web-enabled devices including iPhone, iPad, Droid, Surface, Mac, PC, drones, automated devices, locks, action cameras, 360 cameras, fusion, home security systems, webcams, or other advanced electronic devices. Typically, the device contains an embedded camera and some slew of sharing services or applications. In most cases, the camera application both has the ability to capture photos, tag location while photographed, add text and/or filters, and share content to other consumers of content (whether consumer or commercial)

Additionally, a market for photo sharing-only specific applications has developed, with the advent of Snapchat®, Tiktok®, and Instagram®. Snapchat®, Tiktok®, and Instagram® have grown substantial market share across the social media, data collection, and marketing industries, and their popularity has gained global influence. These applications have grown in scale due from their ability to disrupt and greatly increase content speed from user-to-user and business-to-consumer via an easy to use app, readily available for free on all mobile devices. Additionally, scale has been achieved through internal design thinking applied to physical data process structures and focus on the "Google Mentality" of hiring only the most sought after highly skilled technical employees However, commercial companies and consumers are only leveraging the content at face value. Users view content and depending on their relation or interest, may like, share, and/or subscribe to posts and/or accounts. Often users are so enticed with offerings, they act upon them. The typical user experiences upon acting are: (1) interact within the application itself, (2) redirection to promoter's web site, or (3) encouragement to visit the content sharer's brick and mortar location When this occurs, so many actions happen but little is detailed, and even less is categorized into structured useful databases because of limitations including data ownership (who owns what) and how additional fields are captured. Amongst all extraction tools currently leveraged within multiple industries through facial/text recognition tools, machine learning, and artificial intelligence, only minimal data is captured. The data that is captured is both centralized and decentralized, and only small portions of the data captured is collected and structured within useful databases.

While massive data collection is actively occurring daily, only information linked to fields is being captured, cataloged, maintained, shared, and ultimately sold; leaving an opportunity for more, as the industry is barely scratching the surface of what can be mined and cataloged per piece of content. Thus, there is a massive need for real-time, active machine learning and artificial intelligence processes that not only discern, catalog, and categorize the user capturing content; but allows for a new demand for content, demographics, goods, location, brands, etc. in the background and on the subject.

SUMMARY

The disclosure presented herein relates to a content recognition and data categorization system comprising one or more databases coupled via a network, one or more processors coupled to the one or more databases; and at least one computing device coupled to the one or more processors and the one or more databases via the network, wherein the one or more processors are configured for storing a collection comprising one or more captured content from one or more content providers, wherein the one or more captured content is stored by one or more computing devices that include one or more programs containing instructions associated with the content recognition and data categorization system, performing analysis on the one or more captured content in the collection to determine analysis information on one or more objects identified that are associated with the one or more captured content or the one or more content providers, maintaining a data structure that associates the one or more identified objects with the analysis information that is associated with the one or more captured content or the one or more content providers, making a determination that the one or more identified objects are related to another identified object in the data structure, enabling a search of the data structure, by a user, using an identified object that has been classified as associated with the user as search criteria for other identified objects that are related to the identified object, the relationship determined by analysis information corresponding to the one or more captured content or the one or more content providers.

The present invention is also directed to a content recognition and data categorization system comprising, one or more databases coupled via a network, one or more processors coupled to the one or more databases, and one or more computing device coupled to the one or more processors and the one or more databases via the network, wherein the one or more processors are configured for: capturing one or more captured from one or more content providers storing a collection comprising the one or more captured content from the one or more content providers, wherein the one or more captured content is stored by the one or more computing devices that include one or more programs containing instructions associated with the content recognition and data categorization system, identifying one or more objects associated with the one or more captured content, performing analysis on the one or more captured content in the collection to determine analysis information on the one or more objects identified that are associated with the one or more captured content or the one or more content providers, maintaining a data structure that associates the one or more identified objects with the analysis information that is associated with the one or more captured content or the one or more content providers, making a determination that the one or more identified objects are related to another identified object in the data structure, enabling a search of the data structure, by a first user, using an identified object that has been classified as associated with the first user as search criteria for other identified objects that are related to the identified object, the relationship determined by analysis information corresponding to the one or more captured content or the one or more content providers, generating a notification to the first user when a predetermined number of the one or more content providers or the one or more captured content have identified objects classified as associated with the first user and another identified object, generating a cross promoting plan, the cross promoting plan providing a plan corresponding with the identified object classified as associated with the first user and another related identified object classified as related to a second user, determining the location of the one or more content providers, presenting the location of the one or more content providers on a virtual map to the first user, categorizing the one or more identified objects by location and time, determining if the one or more content providers are within a predetermined maximum distance of a location, comparing the time and location of the one or more content providers to the location and time of the one or more captured content received from the one or more content providers having the one or more identified objects classified as associated with the first user, generating a notification to the first user if the one or more content providers were within the predetermined maximum distance of the location and then the one or more captured content is received from the one or more content provider having the one or more identified objects classified as associated with the first user outside the predetermined maximum distance of the location within a predetermined time frame, associating a transaction point of sale history of the one or more content providers to the one or more content captured by the one or more content providers, generating a notification to the first user, if the one or more identified objects classified as associated with the first user outside the predetermined maximum distance of the location within a predetermined time frame is identified on the transaction point of sale history, categorizing the one or more objects identified in the one or more captured content based on if the one or more identified objects are in the foreground or the background, creating a hierarchical structure of the one or more identified objects and the associated analysis information, the hierarchical structure having descriptors, the descriptors identifying characteristics of the one or more captured content and any feature clusters associated with the one or more captured content, generating a score, the score determined by social media statistics of individual content providers of the one or more content providers who were identified to have one or more captured content having the one or more identified objects classified as associated with a user, generating a notification to the one or more content providers when the one or more content providers whose one or more captured content is received corresponds to the one or more identified objects are within a predetermined distance of a location, determining a risk stratification of the one or more content providers, the risk stratification determined by the occurrence of the one or more identified objects in the one or more captured content from the one or more content providers, presenting the risk stratification of the one or more content providers to the user, generating a risk alert of a content provider if the one or more identified objects in the one or more captured content from the content provider are identified at a predetermined amount of occurrence, generating a notification to a third party in response to the generated risk alert of the content provider, generating a risk alert of a content provider if the one or more identified objects in the one or more captured content from the content provider are identified at a predetermined amount of occurrence, generating a notification to the content provider in response to the generated risk alert, the notification including information beneficial to alleviating the cause of the risk alert, wherein the one or more identified objects have corresponding nutritional information, the nutritional information stored in the one or more databases, the risk stratification based on the nutritional information from the one or more identified objects The present invention is also directed to a computer implemented method for implementing a content recognition and data categorization system, the method comprising, capturing one or more captured from one or more content providers, storing a collection comprising the one or more captured content from the one or more content providers, wherein the one or more captured content is stored by one or more computing devices that include one or more programs containing instructions associated with the content recognition and data categorization system, identifying one or more objects associated with the one or more captured content, performing analysis on the one or more captured content in the collection to determine analysis information on one or more identified objects that are associated with the one or more captured content or the one or more content providers, maintaining a data structure that associates the one or more identified objects with the analysis information that is associated with the one or more captured content or the one or more content provider, making a determination if a first set of one or more identified objects are related to a second set of the one or more identified objects in the data structure, enabling a search of the data structure, by a user, using the one or more identified objects that have been classified as related to the user as search criteria for other one or more identified objects that are related to the identified object, the relationship determined by analysis information corresponding to the one or more captured content or the one or more content providers, generating a notification to the user when a predetermined number of the one or more content providers or the one or more captured content have identified objects classified as associated with the user and another identified object, generating a cross promoting plan, the cross promoting plan providing a plan corresponding with the identified object classified as associated with the user and another related identified object classified as related to a second user.

The preceding and following embodiments and descriptions are for illustrative purposes only and are not intended to limit the scope of this disclosure. Other aspects and advantages of this disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

DETAILED DESCRIPTION

Figure 1:
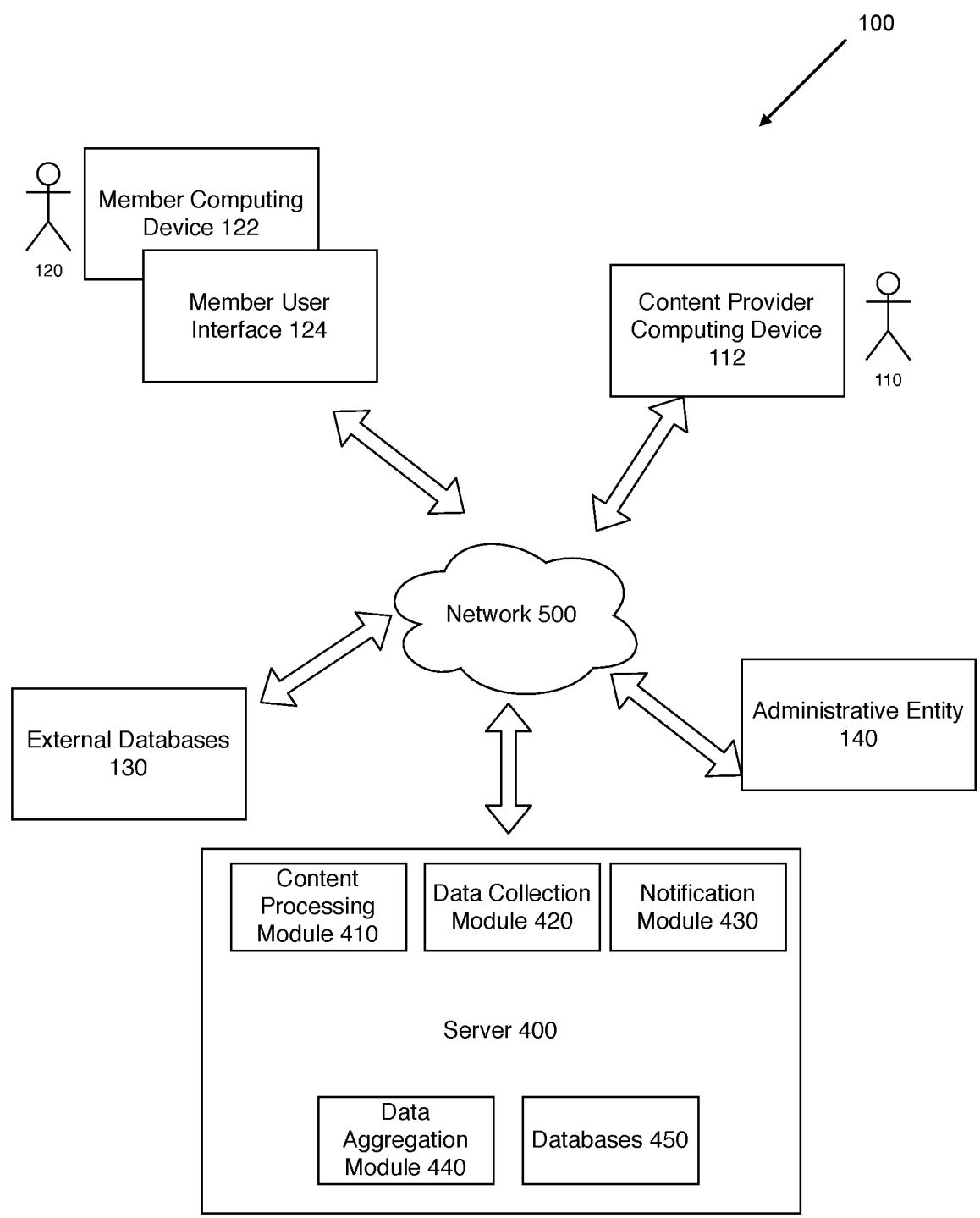
FIG. 1 depicts a block diagram of an embodiment of the Content Recognition and Data Categorization system.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose lower limit is the first number and upper limit is the second number. For example, 25 to 100 mm means a range whose lower limit is 25 mm and upper limit is 100 mm.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure recognizes the unsolved need for a system and method that provides real-time, active machine learning and artificial intelligence processes that are capable of discerning, cataloging, and categorizing digital content; but also analyzing the demographics, goods, location, brands, etc. in the background and on the subject as well as tracking time, location, and purchase history to provide a more accurate vantage point into business and brand analysis. A brand or logo may include, but is not limited to a trademark, animation, text, movies, movie clip, movie still, TV shows, books, musical bands or genres, celebrities, historical or religious figures, geographic locations, colors, patterns, occupations, hobbies or any other thing that can be associated with some demographic information such as a sports team. A business may be but is not limited to sole proprietorship, a partnership, a limited partnership, a limited liability partnership, a corporation, a limited liability company (LLC), nonprofit organization, or a cooperative. However, businesses may also be a single entity or any other body. In other non-limiting embodiments, a member may be an individual, firm having a federal tax ID number(s) as well as public/governmental firms having or any other entity known by those of ordinary skill in the art.

Through a cloud-based data warehouse, the invention may utilize in real-time various existing proprietary APIs, and micro services that discern background, text, audio, video, geo-tracking location, time stamping, and facial recognition details from each piece of content captured by the system. Details of the content then may be stripped from the content, and uploaded to a cloud storage location with additional fields cataloging various items displayed, both in the foregrounds and backgrounds of each picture, discretely. The system in the invention then may decipher product-level details against known and developing product tables wherein the system organizes the cataloged information into appropriate relational cloud-based databases using industry standard open sourced command languages for robust searching and analysis.

The system in the invention provides a free service or subscription based services, whereby subscription based members who acquire a subscription will have the ability to decentralize data and determine performance in all markets because social capturing is at a global scale. Members will have access to complimentary goods of their products or other existing products to see overlapping purchases as well as customer demographics within a particular zip code, based on past purchases, shares, consumed content, interests of their current customer base, or other products related to the business the consumers already own. This allows the member to gather a deeper understanding into the same results yielded by their competition, providing more personal experiences for each consumer, pricing discovery, greater brand awareness, and marketing strategy FIG. 1 is a block diagram constructed in accordance with the principals of the current invention. Content Recognition and Data Categorization System 100 may include one or more content that may be stored, collected, extracted, or acquired from a number of content providers such as content providers 110 operating on a content provider computing device such as content provider computing device 112 wherein content is collected by Content Recognition and Data Categorization system 100 after being sent to an external database or API such as external database 130. In some embodiments, Content Recognition and Data Categorization system 100 may be innate, built into, or otherwise integrated into existing platforms such as iOS, Android, Snapchat, Tiktok, Instagram, Facebook, Raspberry Pi, GoPro iTRON, DJI Manifold, Ubuntu, UNIX, Linux, Windows, or generational equivalent etc. Content provider computing device 112 may acquire various forms of content from input devices installed or connected to content provider computing device 112 such as microphones, speakers, and applications that may be configured to generate content to be uploaded to Content Recognition and Data Categorization system 100.

In one or more non-limiting embodiments, content may also be uploaded or input directly into Content Recognition and Data Categorization system 100 such as a content provider 110 monetization network. In one or more non-limiting embodiments, in exchange for allowing Content Recognition and Data Categorization system 100 to access their content, content providers 110 may be provided monetary rewards or other compensation in the form of discounts, tax breaks, promotional coupons, or gift cards. Content Recognition and Data Categorization system 100 may include one or more members, such as members 120 wherein the members may be presented relevant data about the behavioral aspects of an audience gathered from the content providers 110 and gradually gain business and brand appreciation from the data categorization of the content.

External databases 130, content providers 110, and members 120 may be located in various physical locations that are either located apart or are located in the vicinity of one other. Members 120 of Content Recognition and Data Categorization system 100 may access a member interface such as member user interface 124 using a computing device such as member computing device 122. Member user interface 124 may have a plurality of buttons or icons that are selectable through member user interface 124 by member 120 to instruct Content Recognition and Data Categorization system 100 to perform particular processes in response to the selections.

External databases 130, content provider computing devices 112, and members computing device 122 may be in communication with one or more servers 400 such as server 400 via one or more networks such as network 500. Server 400 may be located at a data center or any other location suitable for providing service to network 500 whereby server 400 may be in one central location or in many different locations in multiple arrangements. Server 400 may comprise a database server such as centralized databases, distributed databases, cloud databases, NoSQL databases, relational database, network databases, hierarchical databases, object oriented databases, MySQL®, Maria DB®, AWZ, Azure, Mongo, Python, Oracle, IBM or other types of servers. Server 400 may have an attached data storage system storing software applications and data. Server 400 may receive requests and coordinate fulfillment of those requests through other servers. Server 400 may comprise computing systems similar to content provider computing devices 112 and member computing device 122.

In one or more non-limiting embodiments, network 500 may include a local area network (LAN), such as a company Intranet, a metropolitan area network (MAN), or a wide area network (WAN), such as the Internet or World Wide Web. Network 500 may be a private network, a public network, or a combination thereof. Network 500 may be any type of network known in the art, including a telecommunications network, a wireless network (including Wi-Fi), and a wireline network. Network 500 may include mobile telephone networks utilizing any protocol or protocols used to communicate among mobile digital computing devices (e.g. member computing device 122 and content provider computing device 112), such as GSM, GPRS, UMTS, AMPS, TDMA, or CDMA. In one or more non-limiting embodiments, different types of data may be transmitted via network 500 via different protocols. In further non-limiting other embodiments, content provider computing devices 112 and member computing devices 122, may act as standalone devices or they may operate as peer machines in a peer-to-peer (or distributed) network environment.

Network 500 may further include a system of terminals, gateways, and routers. Network 500 may employ one or more cellular access technologies including 2nd (2G), 3rd (3G), 4th (4G), 5th (5G), LTE, Global System for Mobile communication (GSM), General Packet Radio Services (GPRS), Enhanced Data GSM Environment (EDGE), and other access technologies that may provide for broader coverage between computing devices if, for instance, they are in a remote location not accessible by other networks.

Content Recognition and Data Categorization system 100 may also include one or more administrative entities such as administrative entity 140. While administrative entity 140 is depicted as a single element communicating over network 500, administrative entity 140 in one or more non-limiting embodiments may be distributed over network 500 in any number of physical locations. Administrative entity 140 may manipulate the software and enter commands to server 400 using any number of input devices such as keyboard and mouse. The input/output may be viewed on a display screen to administrative entity 140.

Server 400 may comprise a number of modules that provide various functions related to Content Recognition and Data Categorization system 100 using one or more computing devices similar to member computing device 122 and content provider computing device 112. Modules may include a content processing module such as content processing module 410, data collection module such as data collection module 420, notification module such as notification module 430, and data aggregation module such as data aggregation module 440.

Modules may be in the form of software or computer programs that interact with the operating system of server 400 whereby data collected in databases such as databases 450 may be processed by one or more processors within server 400 or another component of member computing device 122 and content provider computing device 112 as well as in conjunction with execution of one or more other computer programs. Software instructions for implementing the detailed functionality of the modules may be written in or natively understand C, C++, Visual Basic, Java, Python, Tcl, Perl, Scheme, Ruby, Apple Swift, Android SDK, CSS, Javascript, and HTML etc.

Modules may be configured to receive commands or requests from member computing device 122, server 400, content provider computing device 112, external databases 130, and outside connected devices over network 500. Server 400 may comprise components, subsystems, and modules to support one or more management services for Content Recognition and Data Categorization system 100.

For instance, content processing module 410 may be configured to analyze relevant content provider 110 content collected by data collection module 420. Content processing module 410 may utilize descriptive and predictive datamining capabilities based on previously recognized data collected. Data aggregation module 440 may then analyze aggregated data to provide insights relevant to individual members 120 or a collective group of members 120 such as information relating to content provider's 110 geographic and behavioral statistics. This data is critical to ensuring brand recognition of a member 120 as well as provides a critical path for members 120 to gain appreciation for their marketing and advertising with current and prospective sponsors and partnerships. A suitable process of inventory appreciation, along with any data that enables the process, is an important prerequisite for monetization.

Data aggregation module 440 may also present content provider 110 aggregated statistics related to activity of member 120, level of content provider 110 engagement with businesses, brands, logos, and other identifiers corresponding to member 120, as well as geographic, location, language distributions.

Figure 2:
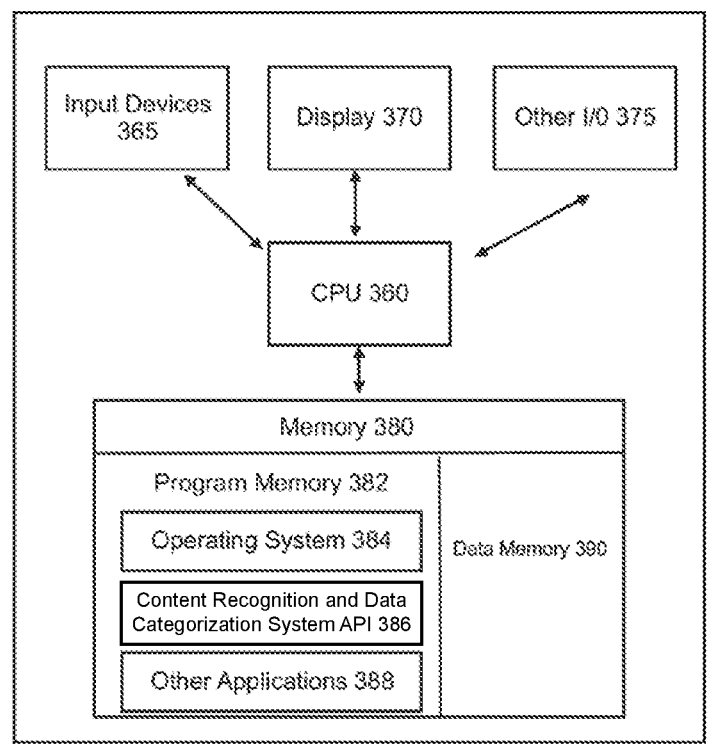
FIG. 2 depicts a block diagram of computing devices of the Content Recognition and Data Categorization system.

One or more embodiments of member computing device 122 and content provider computing device 112 are further detailed in FIG. 2. Member computing device 122 and content provider computing device 112 may comprise hardware components that allow access to edit and query Content Recognition and Data Categorization system 100. Member computing device 122 and content provider computing device 112 may include one or more input devices such as input devices 365 that provide input to a CPU (processor) such as CPU 360 notifying it of actions. The actions may be mediated by a hardware controller that interprets the signals received from input devices 365 and communicates the information to CPU 360 using a communication protocol. Input devices 365 may include but are not limited to a mouse, a keyboard, a touchscreen, an infrared sensor, a touchpad, a wearable input device, a camera- or image-based input device, a microphone, or other user input devices known by those of ordinary skill in the art.

CPU 360 may be a single processing unit or multiple processing units in a device or distributed across multiple devices. CPU 360 may be coupled to other hardware devices, such as one or more memory devices with the use of a bus, such as a PCI bus or SCSI bus. CPU 360 may communicate with a hardware controller for devices, such as for a display 370. Display 370 may be used to display text and graphics. In some examples, display 370 provides graphical and textual visual feedback to a user.

In one or more implementations, display 370 may include an input device 365 as part of display 370, such as when input device 365 is a touchscreen or is equipped with an eye direction monitoring system. In some implementations, display 370 is separate from input device 365. Examples of display 370 include but are not limited to: an LCD display screen, an LED display screen, a projected, holographic, virtual reality display, or augmented reality display (such as a heads-up display device or a head-mounted device), wearable device electronic glasses, contact lenses capable of computer-generated sensory input and displaying data, and so on. Other I/O devices such as I/O devices 375 may also be coupled to the processor, such as a network card, video card, audio card, USB, FireWire or other external device, camera, printer, speakers, CD-ROM drive, DVD drive, disk drive, or Blu-Ray device.

CPU 360 may have access to a memory such as memory 380. Memory 380 may include one or more of various hardware devices for volatile and non-volatile storage and may include both read-only and writable memory. For example, memory 380 may comprise random access memory (RAM), CPU registers, read-only memory (ROM) and writable non-volatile memory, such as flash memory, hard drives, floppy disks, CDs, DVDs, magnetic storage devices, tape drives, device buffers, and so forth. A memory 380 is not a propagating signal divorced from underlying hardware; a memory is thus non-transitory.

Memory 380 may include program memory such as program memory 382 capable of storing programs and software, such as an operating system such as operating system 384, API such as Content Recognition and Data Categorization system API 386, and other computerized programs or application programs such as application programs 388. Memory 380 may also include data memory such as data memory 390 that may include database query results, configuration data, settings, user options or preferences, etc., which may be provided to program memory 382 or any element of Member computing device 122 and content provider computing device 112.

Member computing device 122 and content provider computing device 112 may in some embodiments be mobile computing devices such as an iPhone, Android-based phone, or Windows-based phone, however, this is non-limiting and they may be any computing device such as a tablet, television, desktop computer, laptop computer, gaming system, wearable device electronic glasses, networked router, networked switch, networked, bridge, or any computing device capable of executing instructions with sufficient processor power and memory capacity to perform operations of Content Recognition and Data Categorization system 100 while in communication with network 500. Member computing device 122 and content provider computing device 112 may have location tracking capabilities such as Mobile Location Determination System (MLDS) or Global Positioning System (GPS) whereby they may include one or more satellite radios capable of determining the geographical location of computing device.

Members 120 may initially register to become a registered member associated with Content Recognition and Data Categorization system 100 and Content Recognition and Data Categorization system API 386. Content Recognition and Data Categorization system 100 may be downloadable and installable on member computing devices 122 through an API. In one or more non-limiting embodiments, Content Recognition and Data Categorization system 100 may be preinstalled on member computing devices 122 by the manufacturer or designer. Further, Content Recognition and Data Categorization system 100 may be implemented using a web browser via a browser extension or plugin.

Upon initially signing up with Content Recognition and Data Categorization system 100 through Content Recognition and Data Categorization system API 386, member 120 may be prompted to provide an email address or other identifying sources such as a telephone number. After entering an email address, member 120 may be presented with a text window interface whereby member 120 may enter their name, username, password, phone number, and address.

Pricing schemes for utilizing the various resources of Content Recognition and Data Categorization system 100 may be determined by value delivered to member 120, bandwidth needs, count of discrete licensees and machines, and other determinants. Content Recognition and Data Categorization system 100 may have one or more payment systems that communicate with at least one third-party payment facilitator over network 500. Payment facilitators may include credit or debit card providers and billing service providers that perform invoicing and related functions.

Member 120 may input their credit card or debit card information for a credit card or debit card using any card known in the art, including, without limitation an ATM card, a VISA®, MasterCard®, Discover®, or American Express® card in a credit card input field, or can alternatively use PayPal®, Squarepay®, Bitcoin, or the like. Member 120 may also withdraw from Content Recognition and Data Categorization system 100 for the necessary funds if for instance they have enabled settings through Content Recognition and Data Categorization system 100 providing access to their data to other members 120.

Member 120 may opt-in for Content Recognition and Data Categorization system 100 notifications to be transmitted by notification module 430. Member 120 may by default or be prompted to opt-in to allow Content Recognition and Data Categorization system 100, through Content Recognition and Data Categorization system API 386, to notify member 120 when certain events occur, such as events related to their business, brand, or industry. In further embodiments, member 120 may establish one or more different profiles whereby the different profiles may individually be associated with a specific business, brand, sub-brand, or industry. For instance, if a member 120 is operating under a company and owns a clothing line and perfume line, member 120 may establish a second profile for the company whereby the information presented would only be specific to the perfume line. However, this is non-limiting and all information pertaining to both brands may be presented on one profile.

Member 120 may authorize Content Recognition and Data Categorization system 100 to access information or other data from external sources operated by member 120, such as their own enterprise network having a collection of data in which collection module 420 may be configured to collect information from the enterprise network and integrate the information into Content Recognition and Data Categorization system 100. In one or more non-limiting embodiments, member 120 may be required to provide credentials to a third-party service provider to allow access by Content Recognition and Data Categorization system 100.

Member 120 may also authorize social network access whereby when a social network service is linked to Content Recognition and Data Categorization system 100, access may be granted to various accounts of member 120 and importing of data from those accounts may occur such as to import one or more social network posts and comments. If member 120 authorizes access, data collection module 420 collects or otherwise accesses certain information and stores the information in databases 450.

Upon successful authentication of member 120, a member page may be generated. The member page may be modified, deleted, written to, or otherwise administered by their respective member 120. Administrative entity 140 may modify or delete a member profile page, for example, as a result of inactivity or inappropriate action. Display to member 120 through member user interface 124 may comprise a number of different subpages viewable or accessible through member user interface 124 by selecting one or more tabs or navigational buttons.

Member profile pages may include a notifications subpage whereby notification module 430 may retrieve notifications associated with selected member 120 or information member 120 has selected they wish to receive notifications from. Notifications that appear on the notification subpage may be displayed in chronological order with the newest notifications positioned at the top while older posts may be displayed by scrolling down or by viewing further subpages.

Members 120 may also be presented with the capability to upload content through member user interface 124 whereby the content is then collected by data collection module 420 whereby data collection module 420 stores content on databases 450. Member user interface 124 may present member 120 with filtering criteria of to whom their information is visible to, such as all members 120, certain members 120, or no other members 120, whereby notification module 430 may then only display the post to other members 120 matching these criteria. In one or more non-limiting embodiments, depending on member privacy settings, which may be set or modified through member user interface 124 by member 120, any data by a member 120 may be viewable to other members 120.

The notifications subpage of the member profile page may include a drop down list related to events whereby notification module 430 may retrieve notifications associated with member 120 and other members 120 whereby notification module 430 may apply this data to provide notifications pertaining to member 120, whereby a status indicator may appear to notify member 120 when one or more notifications have occurred.

In one or more non-limiting embodiments, member 120 may search for their business, brand, logo, or other identifier with the intent to claim and verify a brand as their own. The member profile page may include a selectable button to add businesses, brands, and logos to their member profile. Businesses, brands, logos, or other identifiers may come from an existing database stored on databases 450, server 400, or a third-party database that server 400 is in communication with, whereby server 400 may receive results from third-party databases.

After selecting the add brand button, member user interface 124 may display a search window whereby member 120 may search for a business, brand, or logo, or another identifier. A search request having a character string may be entered into the search window by member 120 whereby data collection module 420 may receive this request and then display one or more brands identified using their name or other metadata related to member 120. If member 120 wishes to add a business, brand, logo, or other identifier, member 120 selects the option to request to add a brand. In other non-limiting embodiments, member 120 may select this option by selecting a business, brand, logo, or other identifier when navigating through Content Recognition and Data Categorization system 100. For instance, when viewing statistics related to a separate business, brand, logo, or other identifier.

For example, member 120 may be Matthew who wants to locate his shoe production business named "Matthew's Mobility." Member 120 may type "Matthew's Mobility" with a search request through member user interface 124. Accordingly, a list of results of nearby businesses named Matthew's Mobility" may be provided to member 120 in response to their search. If the business is on the list of results, member 120 may select a button to verify they are an owner or representative of the business and continue adding information about the business, such as business address, business phone number, logos, brands, key descriptors, and other files, such as photos and videos. If the business is not on the list, member 120 may select a button to create a new business. In one or more non-limiting embodiments, a code may also be generated and transmitted to member 120 by email or to member computing device 122 by text message, whereby member 120 may verify the business by entering the generated code into a text block window.

In the event a second member 120 has already verified ownership of this business, member 120 may be presented with a selectable button to request ownership whereby notification module 430 may receive this request and present for display the request to the administrative entity 140 who may then determine the member 120 owner.

Member 120 may be presented through the member profile page through member user interface 124 options for initiating a new business, brand, logo, or other identifier manually in substitution of a search or by preference of member 120. Member 120 may be presented this option during initial registration as a verified member or at any time during a session including after already creating a brand. After selecting this option, member 120 may be presented with a screen whereby member 120 may be prompted to insert information pertaining to the brand, such as business name, business address, target geographic area, business phone number, business website, and key descriptor words. This screen may also be presented when selecting a business, brand, logo, or other identifier via the search method as previously discussed. Additionally, member user interface 124 may allow member 120 to upload associated data including any file attachments, images, or videos directly from a camera on member computing device 122.

The member profile page may include a chat subpage for displaying a chat messaging interface to member 120. In one or more non-limiting embodiments, the chat messaging interface displayed to member 120 has controls through member user interface 124 that allow member 120 to establish a chat session with an administrative entity 140.

Upon successful authentication of a business, brand, or logo, a page may be generated by data collection module 420 using information stored on databases 450 that may be visible to member 120 who has verified ownership, or depending on settings or membership, other members 120. If multiple businesses, brands, and logos, and other identifiers are created or owned by member 120, member 120 may be presented with a drop down menu or other navigational tool whereby member 120 may select a specific business, brand, logo, or other identifier. The data collection module 420 receives this request and displays specific business, brand, logo, or other identifiers selected by member 120.

The member profile page may include a selectable button to add subsidiaries or related companies to the one or more businesses of member 120. After selecting a navigational button corresponding to a subsidiary, member user interface 124 may display a search window whereby member 120 may search for a subsidiary from the pool of businesses. A search request having a character string may be entered into the search window by member 120 whereby data collection module 420 may receive this request and then display one or more subsidiaries or related companies, identified using their name or other metadata related to member 120. If member 120 wants to add a subsidiary or other related company, member 120 may select an option to request that subsidiary or other related company.

Figure 3:
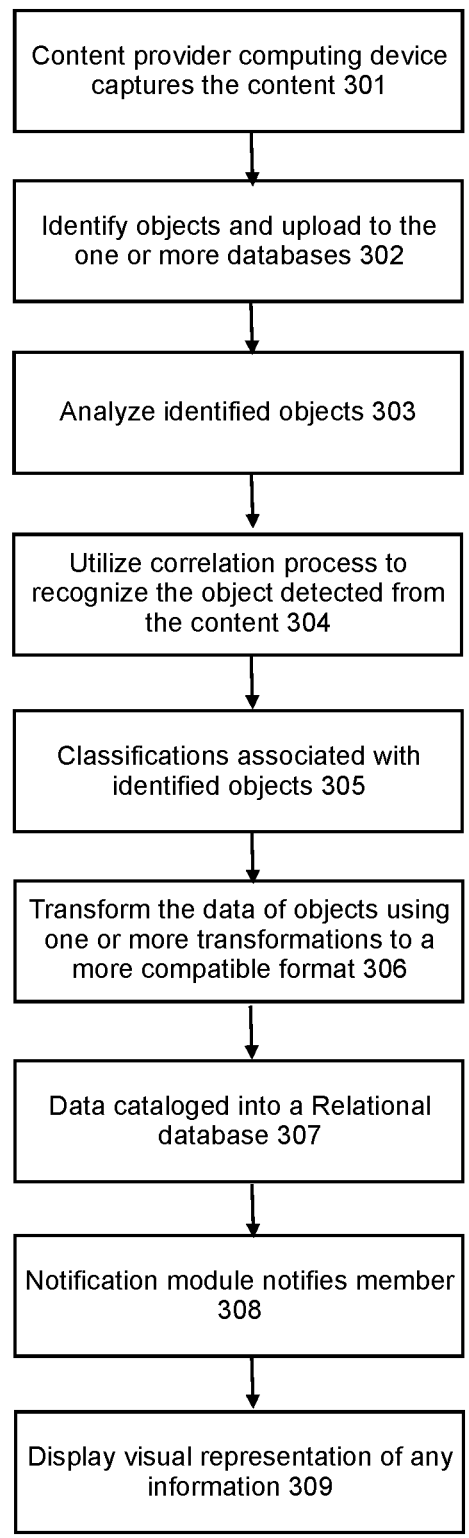
FIG. 3 depicts a method of the Content Recognition and Data Categorization system.

FIG. 3 illustrates an exemplary method of Content Recognition and Data Categorization system 100. Content may be entered into Content Recognition and Data Categorization system 100 through a multitude of processes. Content may be received from a content provider 110 wherein content may be a photo, audio, video, music, and/or content capture within content provider computing device's 112 native camera, photos application, or API. When content is in the form of an image, the image may be presented in any number of image formats such as .jpg, gif, raw, or may be selected from multimedia files such as mpg, .avi, .mov, etc. Content may be captured camera-enabled, web-enabled, and/or local or cloud-enabled photo accessible to be shared. Content may be not be needed to be online to be captured and instead may be captured via Airdrop or equivalent on other operating systems, Bluetooth, or MMS/SMS which uses cell service like a phone call but not data. Any computer definable image format may be utilized for processing by Content Recognition and Data Categorization system 100.

In one or more non-limiting embodiments, content may be received by one or more sensors installed on a property, near a property, or in the vicinity of a property such as a public place, business store, or a content provider's 110 household. Sensors may include one or more suitable types of sensors, such as an optical sensor, an image capturing device such as a still camera or video camera, an audible sensor, a proximity sensor, a movement sensor, or a weight sensor.

Sensors may have infrared ("IR") detectors having photodiode and related amplification and detection circuitry. In one or more other non-limiting embodiments, radio frequencies, magnetic fields, and ultrasonic sensors and transducers may be employed. Sensors may be arranged in any number of configurations and arrangements. Sensors may be configured to send and receive information over network 500, such as satellite GPS location data, audio, video, and time, to server 400 and stored in the one or more databases 450. Content provider's 110 location at a specific time or time period may be determined while content provider 110 is moving from one physical location to the next physical location. In one or more non-limiting embodiments, one or more sensors or cameras may be used to track the x y z coordinates of content provider 110 on one or more planes. Data collection module 420 may analyze content provider's 110 position as they navigate the range of geographic coordinates in the real world such as when they are moving to and from one business to another in real time.

At step 301, content provider computing device 112 may capture the content via embedded software and hardware. The Content Recognition and Data Categorization System 100 then determines if content that has been captured by content provider computing device 112 is shared. If not, the process stops. If the content is being shared, the method proceeds to the next step, wherein it is then determined if the content has been captured via first-party software or third-party software. If the content has been captured by first-party software such as iMessage or airdrop, content provider 110 then selects method of sharing and what tags, filters, etc. (story, select individuals, etc.), wherein the first-party software begins the predefined sharing process through iMessage, airdrop, etc.

Content may be captured via a third-party camera and/or photos application wherein content may be a photo, audio, video, music, and/or other content capture from an application or source such as Snapchat, Tiktok, Facebook, Instagram, Amazon, eBay, Discord, Reddit, Twitter, etc. If the content has been captured by third-party software such as Snapchat, Tiktok, Facebook, Instagram, Amazon, etc., content provider 110 then selects method of sharing and what tags, filters, etc. (story, select individuals, etc.), and at third-party software begins the predefined sharing process through Snapchat, Facebook, Instagram, Amazon, etc.

Content may be a photo, Audio, Video, Music, and/or other content already existing publicly online such as from existing external databases 130. If content already exists publicly online, data collection module 420 may utilize any known network search methods, to initiate a content search or query for content. In one or more non-limiting embodiments, a crowd-source platform may be utilized wherein third-parties may search for content. When content is not accessible, member user interface 124 may provide member 120 the capability to manually allow access for Content Recognition and Data Categorization system 100 to receive content, such as by providing access to an encrypted login subscription.

Concurrently, data collection module 420 may receive content input sources including those intimated in the aforementioned description wherein content processing module 410 may begin image processing on the content received. To do so, Content processing module 410 may natively understand C, C++, Visual Basic, Java, Python, Tcl, Perl, Scheme, Ruby, Apple Swift, Android SDK, CSS, Javascript, and HTML, etc.

Content processing module 410 may natively have Optical Character Recognition (OCR) technology that may detect and recognize one or more type of objects from the content received and may use any technology currently implemented, such as CoCo, Metal, or similar known by those of ordinary skill in the art. For example in some embodiments OCR is a task in computer vision that involves identifying the presence, location, and type of one or more objects in given content Content processing module 410 may integrate Artificial Intelligence and Machine Learning known by those of ordinary skill in the art. Content processing module 410 may perform detection processes for different types of content, including, audio, video, text, or other identifying objects collected from the content. After receiving content collected by data collection module 420, Content processing module 410 may analyze whether the content is a Photo, Video, Audio, or Text element based on file type (codec)/file size.

At step 302, objects identified from the content by content processing module 410, may then be uploaded to the one or more databases 450 with additional fields cataloging various objects displayed both in the foregrounds and backgrounds of each content, as well as objects identified from audio or text into various descriptors. The completeness of the catalog of objects with identifiable descriptors that are searchable or presented to members 120 may sometimes be time intensive, so the next step of analyzing objects can occur contemporaneously with the system's continued effort to receive identified objects using multiple redundancies and algorithms corresponding to such factors as time, location, transaction history, and other relevant factors.

In one or more non-limiting embodiments, the object detected may be a person, or portion of a person such as their hair, face, leg, or arm. Numerous other types of objects may be detected by content processing module 410 including objects carrying text or other alphanumeric characters, and objects associated with people for purpose of identifying a brand or individual such as clothing, a purse, a briefcase, or a hat. Other types of objects that can be detected from content processes include animals, buildings, locations, and landmarks.

At step 303, objects that are detected are then analyzed by content processing module 410. Different recognition results may be generated for different types of objects. For persons, content processing module 410 may identify objects such as exact identity, race, ethnic, and gender classification, hair color or shape. For objects having text, the recognition information may correspond to alphanumeric characters. These characters may be identified as text or estimates of the text carried on the detected object or in information related to an object such as Instagram® post that accompanies a picture that has been posted on a social media account. For other types of objects, the recognition information may indicate or identify objects corresponding to what the detected object is, the class of the detected object, a distinguishing characteristic of the detected object, or an identity of the detected object. In some embodiments when content is uploaded, interference jobs may be ran, returning labels of detected objects and the image coordinates of the corresponding objects. Using this new images may be generated populated with rectangles around the objects. Separate images may be generated for each object category.

To recognize objects from audio wherein the content is an audio file or video file including movies, music, and speech, content processing module 410 may utilize speech to text whereby content processing module 410 generates a set of candidate text interpretations of an auditory signal such as the vocals from a content provider 110. Content processing module 410 may employ statistical language models to generate candidate text interpretations of auditory signals and thus key identifying objects. Objects such as names, locations, businesses, brand names, logos, or other identifying information may then be identified. Content processing module 410 may analyze content by frame (one frame if text or picture, multiple frames if video) to detect objects.

Content processing module 410 may recognize handwritten and cursive text by following the tracings of the script and encoding them as a sequence of directional vectors to identify the one or more text characters. Content processing module 410 may leverage APIs that detect Flesh, color, texture, Grayscale patterns, Face(s), Objects, RBG/HSI, Pixel Clustering.

Content processing module 410 may recognize different levels of granularity corresponding to the objects found in inputted content. In the case where the detected object is a person, the object may correspond to an identification signature that serves as a unique identifier of that person such as to identify an individual from any other individual in a collection of images depicting hundreds of other people. While in one or more non-limiting embodiments, content processing module 410 may only be able to identify an object as a person belonging to a set of persons that are identifiable from other persons in the same pool of people. For example, the object may identify people by ethnic class or gender or identify a person as being one of a limited number of matching possibilities. For facial recognition, content processing module 410 may in addition or instead use data from one or more external databases 130, social networking sites, professional data services, or other such entities.

Content processing module 410 may determine objects related to the location and time of content provider 110 using data acquired from external sources including external databases 130, sensors, direct input, or content provider computing device 122 such as if content provider computing device 122 is located within a predetermined maximum distance of XY coordinate or a point of interest such as a business store. Doing this allows system 100 to collect in near real-time and later present to members 120 the ability to search content generated from content providers 110 in route, while shopping, trying on, purchase, and ex-post amongst content providers 110. Data collection module 420 may receive information such as from a ride sharing vehicle's logged filters, tags, location, recipient, stickers, etc. to further determine the location of content provider 110 as well as the time and how they arrived at the location.

Figure 4A:
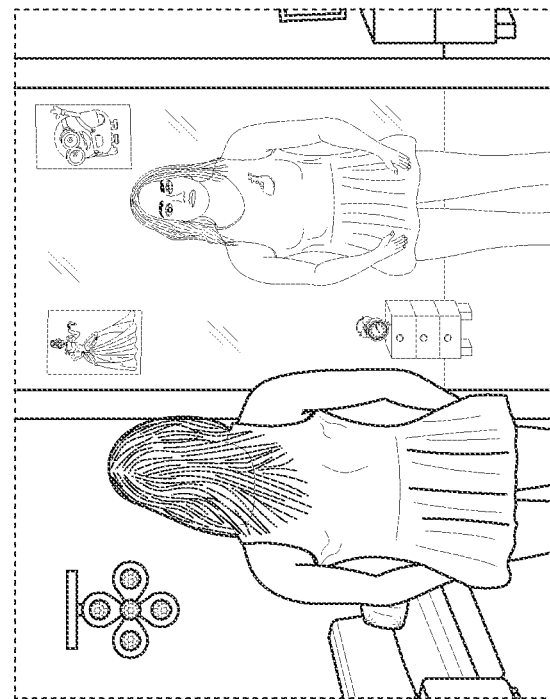
FIG. 4A depicts a sample of captured content of a content provider at a business.
Figure 4B:
FIG. 4B depicts another sample of captured content of a content provider at the business.
Figure 5:
FIG. 5 depicts a sample of captured content of a content provider at the content provider's household.

In one or more non-limiting embodiments, content processing module 410 may group or categorize objects from location and time in a way that efficiently allocates geographical and computational capacity to each received geographic and time received from content provider 110. In one or more non-limiting embodiments, a given geographic area, such as New York City, might include within its mile boundary thousands of business while a city in Montana may only have a few businesses within a mile boundary. Utilizing this information, data aggregation module 440 may compare the location and time of a content provider 110 or content received from content provider 110 corresponding to a business, brand, logo, or other identifier corresponding to member 120 to determine if a product that has been purchased is associated with the brand. For example, as illustrated in FIGS. 4A and 4B, content processing module 410 may identify a content provider 110 is at the location of establishment or business selling a particular good such as a shirt being worn by the content provider 110 in a captured content. Content processing module 410 may then identify content provider 110 wearing the shirt at their home, from a captured content at a later time than when the previous content was captured as illustrated in FIG. 5. Utilizing this information, data aggregation module 440 may determine if content provider 110 has purchased the shirt.

Content provider's 110 transaction history may be used to extract buying preferences or trends. Content processing module 410 may determine descriptors related to content provider 110 transaction data such as their credit card history collected by data collection module 420 to determine that the content provider 110 has purchased a product associated with a business, brand, logo, or other identifier of member 120 wherein content processing module 410 may compare the product purchase with content uploaded by the content provider 110 of the product associated with the brand uploaded prior, during, and after the purchase. Individual members 120 and companies may link transaction tables with content shared. Through system 100, members 120 may also be provided the potential to join transaction point of sale history to pre-transaction shared content to determine if transactions were made as well as purchasing trends.

Data collection module 420 may collect various types of data (or metadata) such as availability, reviews, and other types of metadata such that data aggregation module 440 may aggregate this data as well to provide more accurate tracking of trends.

Content processing module 410 may separate the foreground from the background to identify more objects and their correlation to one another. Content processing module 410 may utilize background segmentation, noise filtering, as well as foreground segmentation into regions of interests, such as those containing moving objects. In one or more non-limiting embodiments, content processing module 410 may calculate a reference reflectance characteristic for a subject profile, and for each region not intersecting a determined subject profile, calculating a reflectance characteristic.

The non-intersecting region reflectance characteristic may then be compared with the reference reflectance characteristic. A non-intersecting region may be designated as foreground when the non-intersecting region reflectance characteristic is determined to be within a threshold of the reference reflectance characteristic and designated as a background when the non-intersecting region reflectance characteristic is determined to be outside a threshold of the reference reflectance characteristic. Determination of foreground and background may also be calculated by any other method known by those of ordinary skill in the art such that content processing module can identify objects in the foreground and the background.

At step 304, Content processing module 410 may use a correlation process to recognize the object detected from the content to determine if the object is a product, item, subject, or facial and geographical details. Various types of functionality may be enabled with the correlation process, including for example, search, categorization, and text object research whereby Content processing module 410 may ping existing product, facial, object, etc. known databases. Content processing module 410, depending on the object, may then interpret subject(s) and other details from the content or interpret product based on SKU, color, brand, year created, and other details.

In one or more non-limiting embodiments, the object may be a person. In such an embodiment, content processing module 410 generates correlation information that is an identity, or more generally, identification information to the person. In another embodiment, the recognized object carries text, and the correlation information assigns meaning or context to the text.

At step 305, during this analysis of objects, processes may be performed by content processing module 410 on objects which enables classifications to be associated with the objects into a hierarchical structure to facilitate analysis, searching, and recognition of business, brand, logo, or other identifiers.

Objects may be identified using a descriptor for creating the hierarchical structure. Objects, associated with the analyzed content, includes descriptors which identify characteristics of the content and any feature clusters associated with the content. The descriptors may be defined in a hierarchical tree structure with the top-level descriptor mapping to the highest branch. For each branch descriptor, labels may be assigned and stored in the databases 450 to facilitate search and presentation to member 120. From each branch descriptor, additional branches may be defined, for example, second-level branch descriptors that branch off from the first branch descriptor. Additional branch descriptors may branch off from the second brand descriptor. Each descriptor is associated with clusters of features that are common to objects and can be mapped together. For example, a top-level branch classifier may be associated with images of shoes, while a second-level branch may define sneakers in particular, while a third-level branch may be associated with colors, shapes, brands, logos.

At step 306, content processing module 410 may then use an Extract Transform Load (ETL) tool wherein the ETL extracts data from databases 450, transforms the extracted data using one or more transformations to a more compatible format, such as one or more tables or graphs that may be stored as tables or graphs in the one or more databases 450.

At step 307, data may also be cataloged into a Relational database in the one or more databases 450 by content processing module 410. Content with characteristic tags relating/correlating descriptors may then be presented to member 120 or member 120 may directly access relational database. In further steps, Content Recognition and Data Categorization system 100 may directly mirror the production environment to redundancy, directly mirror the production environment to test the environment, apply user level access to test environments, and test environments accessible locally to clients via subscription service.

At step 308, notification module 430 may assemble an automatically generated email, text, application notification, or other notification message that includes member 120, services provided, date, time, and other information associated with their business, brand, logo, or other identifier that has been inputted by member 120 through member user interface 124 and detected in the one or more databases whereby the notification may be transmitted to member 120.

In further embodiments, notification module 430 may generate synchronization messages, such as an email message, text message, or calendar invitation for each member 120 related to Content Recognition and Data Categorization system 100 causing data, such as tables, to be included in a local personal information manager application connected to Content Recognition and Data Categorization system 100, such as Microsoft Outlook and Google Calendar. In one implementation, the synchronization message may include a calendar data exchange file, such as an iCalendar (.ics) file.

At step 309, Data Aggregation Module 440 may display to member 120 a visual representation of any information collected on the one or more databases 450 using charts, bar graphs, polygonal line graphs, pie charts, radar charts, and other charts/graphs, or any form of presentation known by those of ordinary skill in the art.

Data Aggregation Module 440 may utilize the data from content providers 110 social media statistics to determine consumer account usage information and determine "potential influence" or "potential outreach" individual content providers 110, who were identified to have content related to businesses, brand, logo, or other identifiers, of member 120. Data Aggregation Module 440 may generate social influence scores for the content providers 110 based on this information collected by data collection module 420.

Data Aggregation Module 440 may generate social influence scores to be associated with a content provider 110 for a particular demographic, location, or time including determining a reach of the content provider and evaluating the reach as compared to other content providers and presenting the score to member 120. In one or more non-limiting embodiments, Content Recognition and Data Categorization system 100 may allow member 120 to communicate with content provider 110 for marketing campaigns and advertisements in exchange for monetary commission to further increase brand recognition.

Data Aggregation Module 440 may utilize the data collected to determine risk stratification for the identifying and predicting of which content providers 110 are at high risk or likely to be at high risk for one or more medical disorders, diseases, or other occurences and prioritizing the content providers 110 which may be beneficial for members making risk assessments for insurance, medical uses, and brand ambassadors or businesses that are looking to target consumer who are heavy users.

For instance, content processing module 410 may detect objects such as item boxes or UPC codes from one or more content providers and calculate calories, sugar, THC, red meat, caffeine, sodium, protein, total fat, saturated fat, trans fat, cholesterol, total carbohydrates, dietary fiber, and other vitamins, nutrients or ingredients, etc. to determine food and drink consumption, such as if a content provider 110 were drinking over ten energy drinks per day wherein the amount of caffeine and sugar per bottle may be determined from data in the one or more databases 450 or external databases 130. Data Aggregation Module 440, using algorithms or other such approaches, may process risk assessments and present the information to members 120.

Data Aggregation Module 440 may utilize the data from the relational database to attempt to locate other or a second businesses, brand, logo, or other identifier in the one or more databases 450, that match, or are otherwise related to, the potential match information of member's 120 business, brands, logos, or other identifiers. For example, if Data Aggregation Module 440 identifies a book in the one or more databases 450, Data Aggregation Module 440 may attempt to determine whether there are any other books in the one or more databases 450 that match or appear in content together or from a content provider 110.

Data Aggregation Module 440 may allow member 120 to contract with owner of second businesses, brand, logo, or other identifier calculate a beneficial cross licensing deal between member and owner of second businesses, brand, logo, or other identifier. In other embodiments, Data Aggregation Module 440 may create a cross-licensing deal between members 120 such as an owner of a first business, brand, logo, or other identifier and owner of a second business, brand, logo, or other identifier on their own without notifications. In some examples, the employees of the first company and the second company may be connected to each other such as by inter-business activities, events, proximity, etc. thus increasing the perceived value of the relationship In one or more non-limiting embodiments, Data Aggregation Module 440 may utilize one or more suggestion algorithms or other such approaches to determine related elements based on the determined matches, such as a third businesses, brands, logos, or other identifiers in the one or more databases being related to the second businesses, brand, logo, or other identifier but not itself related to member's 120 second businesses, brand, logo, or other identifier. Data Aggregation Module 440 may also utilize existing or additional aggregated data to obtain various other types of data as well.

Data Aggregation Module 440 may bundle at least a portion of the information for the potential matches to send to member 120 as part of one or more messages or responses to the original request of member 120 through member user interface 124. In one or more non-limiting embodiments, the information from Data Aggregation Module 440 may arrive at different times, as different types of information might take longer to analyze, etc. In these cases, notification module 430 may send multiple messages to member computing device 122 as the information becomes available.

Data Aggregation Module 440 may display to member 120 information related to the type, amount, and how frequent objects of another business, brand, logo, or other identifier, may match or correspond to the business, brand, logo, or other identifier of member 120. For example, when the number of matches of objects of member's 120 brand to another brand reaches over a predetermined percentage, such as 10%, this information may be sent in a notification or presented to member 120 as a related brand. Data Aggregation Module 440 may also determine a brand is a related brand to member's 120 brand when a certain number of content providers 110 or captured content have descriptors including member's 120 brand and another brand.

Data Aggregation Module 440 may also determine and present other relevant information, such as if another brand, logo, or business has deviated from that of member's 120 business, brand, or logo as well as individual businesses, brands, or logos corresponding to member 120 within a certain geographical region, demographic, type of content, or time period (for instance >30%). This may help member 120 identify if their business is behind a similar business in a specific area such that they may better analyze their marketing reach. Data Aggregation Module 440 may also determine and account for the relationship of content providers 110 who have recently been associated with a brand, logo, or business of member 120 to other existing content providers 110.

Data Aggregation Module 440 may present the location of objects classified as relating to member 120 or, in one or more non-limiting embodiments, content providers 110 who have uploaded or otherwise have content integrated into Content Recognition and Data Categorization system 100 corresponding to the objects that have been classified as relating to member 120, in real time or at a previous time period such as last weekend or a holiday. The presentation may be in the form of a window displayed to the member 120. Information related to objects classified as relating to member 120 may also be presented with a geo-spatial environment having a virtual map of the geographical location in which objects are located. The virtual map may have geography and topography, which parallels the geography and topography of the physical real world.

An object's position on the virtual map may correspond to their position in the real world. For instance, if an object was uploaded when content provider 110 was at the corner of 1st and 2nd street in the real world, the object may be presented in a corresponding position on the virtual map pertaining to the corner of 1st and 2nd street.

For instance, a range of longitudinal and latitudinal coordinates defining a geographic area or space in the real world may be mapped to a corresponding range of longitudinal and latitudinal coordinates defining a virtual space on the virtual map as well as each individual coordinate in the range. The graphical map may be displayed with content and objects displayed as markers, pins, or identifiers at their respective locations including indicia showing if the object was integrated at that location in real time or at a previous time.

For example, data collection module 420 may receive content from a content provider that they are live streaming, such as when they are shopping at a mall while content processing module 410 may also receive content from a previous time that content provider 110 has uploaded from their phone photograph library. In one or more non-limiting implementations, the current location may be a graphical item that is a circle, a square, or any other shape, a human-shaped icon, a text representation, a picture or photo, or any other graphical or textual item that signifies the current location of the content provider 110 or content provider computing device 112. For example, a blue colored graphical item may represent content or number of contents for which the system has classified as having a relation to member 120 while a red colored graphical item may represent content providers for which the system has classified as providing content associated with member 120.

The map may also include graphical representations of venues, locations, monuments, buildings, streets, lakes, and other locational landmarks representing the vicinity and area surrounding the content providers, content, or descriptors. Indicators may vary with the display region and zoom level of the map or are independent of the characteristics of the map. Indicators may be grouped together and depicted as other indicators such as hot spots.

When a content provider 110 is within a predetermined distance of a businesses, or within the business, or has uploaded content at the location of a business of a member 120, an automated advertisement procedure may be initiated by notification module 430. An automatic advertisement may appear to content provider 110, within a predetermined distance through an external platform such as Facebook or advertisement-bidding platform. In other embodiments, advertisements may be sent to content providers 110 who are approaching other businesses, brands, or logos such as those having a certain match criterion as determined by data aggregation module 440 to help deter content providers 110 from that business and direct content provider to a business of member 120. Advertisement may be in the form of offers such as discounts, or other incentives presented to content provider 110 through an external platform.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A content recognition and data categorization system comprising:
   one or more databases coupled via a network; and
      a computing system having a non-transitory computer-readable medium comprising code, the computing system having one or more processors coupled to the one or more databases over the network, wherein instructions are executed by the computing system to perform:
      maintaining a database of the one or more databases on a server in communication with one or more third-party content provider computing device systems and one or more user computing device systems;
      storing a plurality of user profiles, each user profile being unique and being associated with a first unique user entity accessible by the one or more user computing device systems, wherein at least one first unique user profile comprises personal or demographics information related to a first unique user and information representing at least one brand identifier of the first unique user that have been selected to be associated with the first unique user on the content recognition and data categorization system, the server adapted to access the one or more databases and to receive inputs, including from the one or more user computing device systems;
   collecting one or more captured content in different formats from the one or more third-party content provider computing device systems by one or more content search queries for the one or more captured content available on an interne or by receiving shared content by the one or more third-party content provider computing device systems;
   storing the one or more captured content in the one or more databases;
      performing detection processes for the different formats of the one or more captured content;
      identifying one or more objects associated with the one or more captured content using Optical Character Recognition technology;
      designating a non-intersecting region as foreground when a non-intersecting region reflectance characteristic is determined to be within a threshold of a reference reflectance characteristic and designating the non-intersecting region as a background when the non-intersecting region reflectance characteristic is determined to be outside a threshold of the reference reflectance characteristic;

transforming extracted data of the one or more identified objects from the different formats of the one or more captured content to a standardized format by stripping the one or more captured content for one or more details and uploading the one or more details with additional fields cataloging various items and image coordinates of each of the one or more captured content using one or more active machine learning and artificial intelligence processes; and searching the one or more databases, in response to the transformed extracted data, to identify one or more second brand identifiers from the one or more identified objects; and determining a brand deviation when a predetermined number of the one or more captured content include the one or more second brand identifiers a predetermined percentage more than the at least one brand identifier.

2. The content recognition and data categorization system of claim 1, wherein the instructions are executed by the computing system to further perform: determining the brand deviation when the predetermined number of the one or more captured content include the one or more second brand identifiers the predetermined percentage more than the at least one brand identifier within a certain geographical region, demographic, type of content, or time period.

3. The content recognition and data categorization system of claim 1, wherein the instructions are executed by the computing system to further perform: evaluating the one or more identified objects and searching the database to identify one or more second potential associated brand identifiers to a second unique user based at least in part on a second unique user profile and the one or more second brand identifiers that have been selected to be associated with the second unique user on the content recognition and data categorization system and the data collected from the one or more identified objects, wherein the one or more identified objects are received from the one or more third-party content provider computing device systems;

determining the one or more second potential associated brand identifiers to the second unique user from the one or more captured content; and determining a brand deviation between the at least one brand identifier of the first unique user and the one or more second brand identifiers of the second unique user when a predetermined number of the one or more captured content include a higher percentage of the one or more second brand identifiers of the second unique user more than a first identified object of the one or more identified objects that is one of the one or more identified second brand identifiers to the first unique user.

4. The content recognition and data categorization system of claim 1, wherein the instructions are executed by the computing system to further perform:

determining a location of the one or more third-party content provider computing device systems;

generating a virtual map; and presenting at a display associated with the first unique user, data representing the location of one or more content providers on the virtual map in real time, wherein the at least one brand identifier and the one or more second brand identifiers of the one or more captured content are presented on the virtual map at their respective location where the one or more captured content was taken.

5. The content recognition and data categorization system of claim 4, wherein the instructions are executed by the computing system to further perform: grouping or categorizing the one or more identified objects by location and time of the one or more third-party content provider computing device systems when the one or more captured content was captured by the one or more content providers to allocate geographical and computational capacity for each of the location and the time received from the one or more content providers, wherein a first color graphical item represents the one or more captured content that has been classified as related to the first unique user and a second color graphical item represents the one or more content providers providing the one or more captured content that has been classified as related to the at least one brand identifier of the first unique user.

6. The content recognition and data categorization system of claim 5, wherein the instructions are executed by the computing system to further perform:

determining that the one or more third-party content provider computing device systems are within a predetermined maximum distance of a predetermined location, wherein the predetermined location is a store selling the at least one brand identifier of the first unique user.

7. The content recognition and data categorization system of claim 6, wherein the instructions are executed by the computing system to further perform:

comparing the time and location of the one or more third-party content provider computing device systems to the location and time of the one or more captured content received from the one or more third-party content provider computing device systems having the one or more identified objects that are the at least one brand identifier of the first unique user;

determining that the one or more third-party content provider computing device systems were within the predetermined maximum distance of the predetermined location when a first captured content of the one or more captured content is received from the one or more third-party content provider computing device systems having a first identified object of the one or more identified objects that are one of the at least one brand identifier of the first unique user and the one or more third-party content provider computing device systems were outside the predetermined maximum distance of the predetermined location when a second captured content of the one or more captured content is received from the one or more third-party content provider computing device systems having the first identified object; and presenting at the display associated with the first unique user, a determination that the one or more content providers has purchased the at least one brand identifier of the first unique user.

8. The content recognition and data categorization system of claim 7, wherein the instructions are executed by the computing system to further perform:

receiving a transaction point of sale from a third-party sales database;

determining a relationship between the transaction point of sale with the first identified object of the one or more identified objects and that the one or more third-party content provider computing device systems are outside the predetermined maximum distance of the predetermined location within a predetermined time frame of an identified time on the transaction point of sale; and presenting at the display associated with the first unique user, a determination that the one or more identified objects was purchased by the one or more content providers.

9. The content recognition and data categorization system of claim 8, wherein the instructions are executed by the computing system to further perform:

receiving the one or more captured content from one or more sensors on one or more image capturing devices installed at the predetermined location.

10. The content recognition and data categorization system of claim 1, wherein the at least one brand identifiers and one or more potential associated brand identifiers is a specific business or logo or affiliates wherein further instructions are executed by the computing system to perform: integrating data from one or more networks associated with the first unique user into the content recognition and data categorization system.

11. The content recognition and data categorization system of claim 10, wherein the instructions are executed by the computing system to further perform:

creating a hierarchical structure of the one or more identified objects and associated analysis information, the hierarchical structure having descriptors, the descriptors identifying characteristics of the one or more captured content and any clusters associated with the one or more captured content; and utilizing predictive data-mining capabilities based on previously data collected.

12. The content recognition and data categorization system of claim 1, wherein the instructions are executed by the computing system to further perform:

receiving social media statistics of individual content providers from one or more third-party social media databases;

determining the one or more captured content of the individual content providers received from one or more third-party content provider computing device systems having the one or more identified objects that are the at least one brand identifier of the first unique user;

determining an influence score from the received social media statistics at least based on a reach of the individual content providers on social media platforms for a particular demographic, location, or time to determine a reach of the individual content provider and evaluating the reach as compared to other content providers; and enabling communication channels for the one or more content providers having the one or more captured content having the one or more identified objects that are the at least one brand identifier of the first the unique user to communicate for a marketing campaign in exchange for monetary rewards or other compensation.

13. The content recognition and data categorization system of claim 1, wherein the instructions are executed by the computing system to further perform:

determining if that the one or more captured content is shared wherein when the one or more captured content is not shared a process is terminated; and determining that the one or more captured content has been captured via first-party software or third-party software.

14. A content recognition and data categorization system comprising:

one or more databases coupled via a network; and
a computing system having a non-transitory computer-readable medium comprising code, the computing system having one or more processors coupled to the one or more databases over the network, wherein instructions are executed by the computing system to perform:

maintaining a database of the one or more databases on a server in communication with one or more third-party content provider computing device systems and one or more user computing device systems;

storing a plurality of user profiles, each user profile being unique and being associated with a first unique user entity accessible by the one or more user computing device systems, wherein at least one first unique user profile comprises personal information related to a first unique user and information representing at least one brand identifier of the first unique user that have been selected to be associated with the first unique user on the content recognition and data categorization system, the server adapted to access the one or more databases and to receive inputs, including from the one or more user computing device systems;

collecting one or more captured content in different formats from the one or more third-party content provider computing device systems by one or more content search queries for the one or more captured content available on an interne or by receiving shared content by the one or more third-party content provider computing device systems;

storing the one or more captured content in the one or more databases;

performing detection processes for the different formats of the one or more captured content;

designating a non-intersecting region as foreground when a non-intersecting region reflectance characteristic is determined to be within a threshold of a reference reflectance characteristic and designating the non-intersecting region as a background when the non-intersecting region reflectance characteristic is determined to be outside a threshold of the reference reflectance characteristic;

identifying one or more objects associated with the one or more captured content using Optical Character Recognition technology; and transforming extracted data of the one or more identified objects from the different formats of the one or more captured content to a standardized format by stripping the one or more captured content for one or more details and uploading the one or more details with additional fields cataloging various items of each of the one or more captured content using one or more active machine learning and artificial intelligence processes in real time.

15. The content recognition and data categorization system of claim 14, wherein the instructions are executed by the computing system to further perform:

determining a risk stratification of the one or more content providers, the risk stratification determined by an occurrence of the one or more identified objects in a plurality of the one or more captured content from the one or more content providers;

presenting the risk stratification of the one or more content providers to the user; and identifying which of the one or more content providers are at certain risk thresholds, such as high risk, or likely to be at high risk, on effects from the occurrence, whether one time or prolonged use, exposure, or consumption.

16. The content recognition and data categorization system of claim 15, wherein the instructions are executed by the computing system to further perform:

prioritizing the one or more content providers for making risk assessments for insurance, medical uses, the prolonged use, the exposure, the consumption, and brand ambassadors or businesses that are looking to target consumer who are heavy user.

17. The content recognition and data categorization system of claim 16, wherein the instructions are executed by the computing system to further perform:

generating a risk alert of a content provider that the one or more identified objects in the one or more captured content from the content provider are identified at a predetermined amount of occurrence; and generating a notification to a third-party computing device in response to the generated risk alert of the content provider.

18. The content recognition and data categorization system of claim 16, wherein the instructions are executed by the computing system to further perform:

generating a risk alert of a content provider that the one or more identified objects in the one or more captured content from the content provider are identified at a predetermined amount of occurrence; and generating a notification to the content provider in response to the generated risk alert, the notification including information beneficial to alleviating a cause of the risk alert.

19. The content recognition and data categorization system of claim 18, wherein the one or more identified objects have corresponding nutritional information, the nutritional information stored in the one or more databases, the risk stratification based on the nutritional information from the one or more identified objects, over one-time or aggregated and prolonged use or consumption.

* * * * *